S. D. SHIMER.
DRIVING MECHANISM FOR VEHICLES.
APPLICATION FILED JUNE 26, 1917.

1,265,265.

Patented May 7, 1918.
2 SHEETS—SHEET 1.

Witnesses
Mary A. Ingler.
C. R. Ziegler.

Inventor,
Stanley D. Shimer
by Joshua R. H. Potts
his Attorney

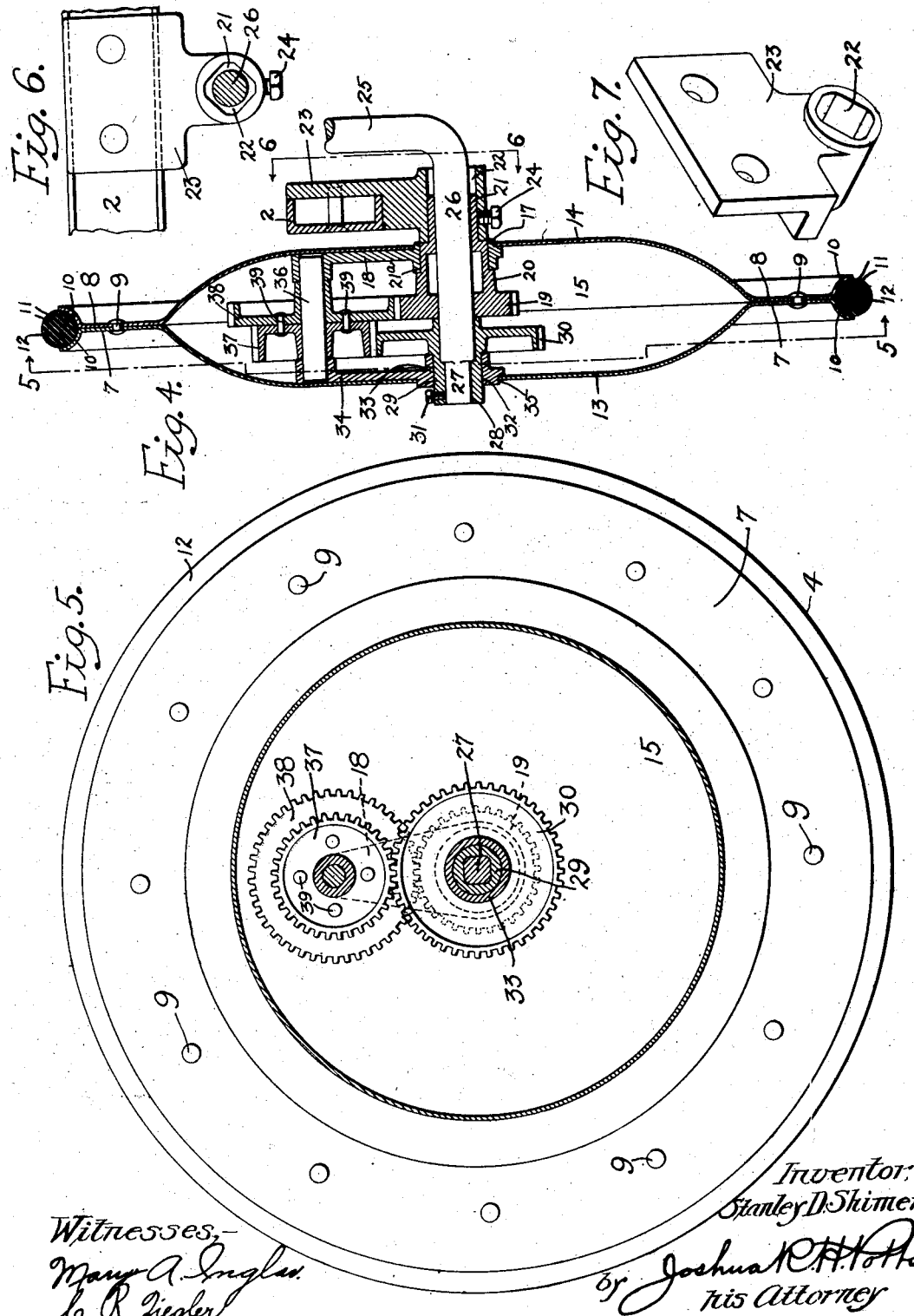

UNITED STATES PATENT OFFICE.

STANLEY D. SHIMER, OF BETHLEHEM, PENNSYLVANIA.

DRIVING MECHANISM FOR VEHICLES.

1,265,265.  Specification of Letters Patent.  Patented May 7, 1918.

Application filed June 26, 1917. Serial No. 176,933.

*To all whom it may concern:*

Be it known that I, STANLEY D. SHIMER, a citizen of the United States, residing at Bethlehem, in the county of Northampton and State of Pennsylvania, have invented certain new and useful Improvements in Driving Mechanism for Vehicles, of which the following is a specification.

My invention consists of an improved driving mechanism for vehicles, and is particularly adapted as a driving mechanism for foot-propelled vehicles in which the wheels are rotated by the pedals.

One object of my invention is to provide a driving mechanism of the above mentioned character which will effect the easy operation of the vehicle when comparatively little power is applied to the pedals.

Another object is to so construct my invention that the major portion of the driving elements will be contained within the driving wheels, thus keeping them free from dirt and from injuring the clothing of the rider.

A further object is to so design my invention that it will be durable and can be quickly and cheaply manufactured and easily applied to a vehicle.

These objects, and other advantageous ends which will be described hereinafter, I attain in the following manner, reference being had to the accompanying drawings in which—

Fig. 4 is an enlarged sectional elevation taken on the line 4—4 of Fig. 2.

Fig. 5 is a section on the line 5—5 of Fig. 4.

Fig. 6 is a section on the line 6—6 of Fig. 4.

Fig. 7 is a perspective view of a bearing hanger which I employ.

Figure 1:
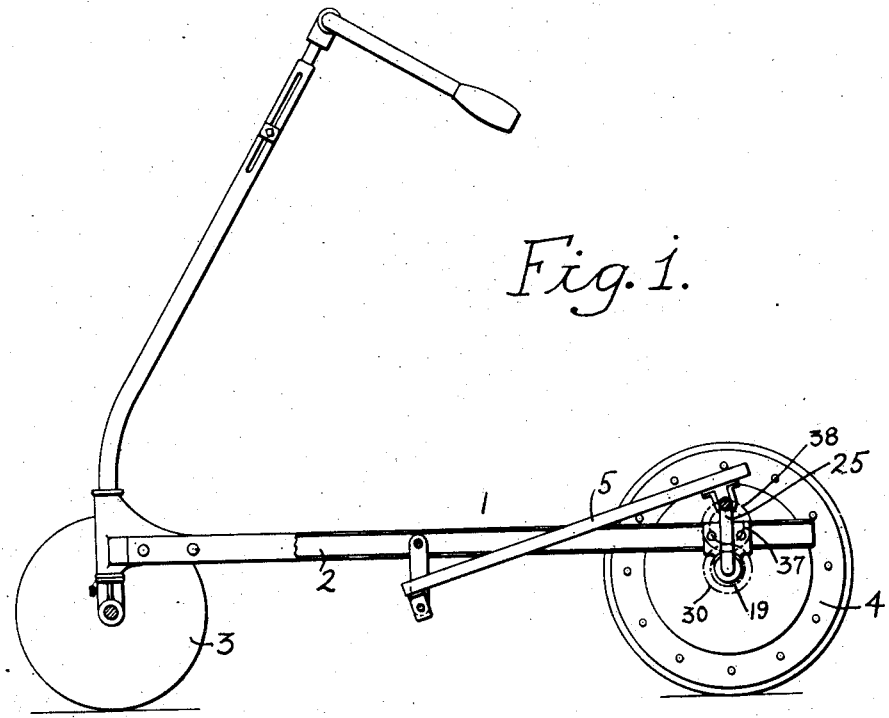
Figure 1 is an elevation, partly in section, of a foot-propelled vehicle showing my invention applied thereto.
Figure 2:
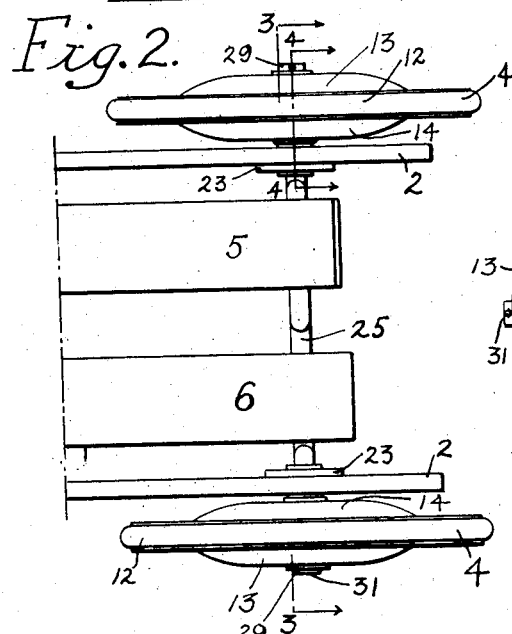
Fig. 2 is an enlarged fragmentary plan view of that portion of the vehicle shown in Fig. 1 which has my invention applied thereto.
Figure 3:
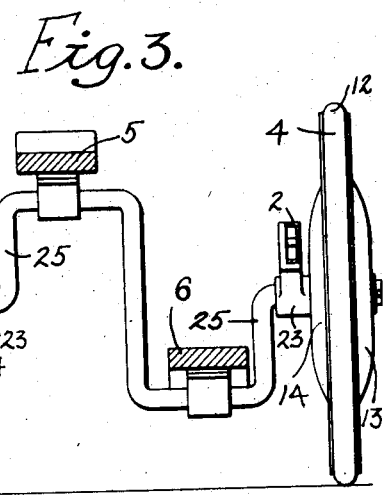
Fig. 3 is a transverse sectional elevation taken on the line 3—3 of Fig. 2.

Referring to the drawings, 1 represents a foot-propelled vehicle having a frame 2, wheels 3 and 4, and pedals 5 and 6. The wheels 4 are the driving wheels and are constructed in accordance with my invention.

Each of the wheels 4 is made in two sections 7 and 8, preferably of sheet metal, which are secured together by rivets 9 or other suitable means. The peripheries of said sections have registering recesses 10 which form a circumferentially extending groove 11 for a rubber tire 12 (see Figs. 4 and 5).

The sections 7 and 8 have portions 13 and 14 which bulge in opposite directions to provide a chamber 15.

Since each of the wheels 4 is similarly constructed and contains driving elements which are similarly formed, I will describe in detail but one wheel, it being understood that the parts are duplicated in both of the wheels 4 including the means for attaching the wheels to the frame 2.

The portion 14 of the section 8 of each of the wheels 4 has a hole 16 through which extends a boss 17 of a plate 18, the latter being secured to the inner surface of said portion 14.

A gear wheel 19 is mounted within the chamber 15 and has a hub 20 provided with a cylindrical portion 21ᵃ which fits a cylindrical hole in said boss 17. The hub 20 has another extension 21 which is made angular on its outer surface to fit within an angular hole 22 in a hanger bearing 23, said hanger bearing being bolted or otherwise rigidly secured to the frame 2. A set screw 24 is provided to secure the extension 21 within said angular opening 22 of the hanger bearing 23. It will thus be understood that the gear wheel 19 is held stationary with respect to the frame 2 and hanger bearing 23, and that the wheel is free to rotate in view of the cylindrical connection between the plate 18 and the cylindrical extension on the hub of the gear wheel 19.

A crank shaft 25, to which the pedals 5 and 6 are operatively connected, has a cylindrical portion 26 which extends through cylindrical bores formed in the gear wheel 19 and extension 21. At its outer end, the shaft 25 is made angular as shown at 27 and this angular portion 27 fits within an angular hole 28 in the hub 29 of a gear 30.

A set screw 31 is provided to secure the hub 29 to the angular portion 27 of said shaft 25, the hub 29 on its outer surface being made cylindrical and fitting a cylindrical bore 32 in a boss 33 which is formed on a plate 34. The boss 33 extends through a hole 35 in the portion 13 and the plate 34 is rigidly secured to the inner surface of said portion 13.

The plates 18 and 34 form a bearing for a stud shaft 36 upon which freely rotate two gear wheels 37 and 38. The gear wheel 37, is of smaller diameter than the gear wheel 38 and is secured thereto either by rivets 39 as illustrated or it may be formed integral therewith.

The gear wheel 37 meshes with the gear wheel 30, and the gear wheel 38 meshes with the gear wheel 19.

The operation of my invention is as follows:—

When the crank shaft 25 is rotated, due to the action of the pedals 5 and 6, the gear wheel 30, which is directly secured thereto, will rotate the gears 37 and 38, and since the gear wheel 19 is held against rotation, the gear wheel 38 will travel in a planetary movement around the gear wheel 19 and since the stud shaft, upon which the gear 38 is mounted, has its bearing in the plates 34 and 18, the sections 7 and 8 will be rotated and consequently the driving wheels 4 will be rotated, it being understood that the plates 34 and 18 are secured respectively to the sections 7 and 8.

It will thus be noted that all of the gear wheels are contained within the chambers provided in the driving wheels 4. It will be further noted that with the construction illustrated, the wheels may be readily removed merely by loosening the set screws 24 and 31.

Another important feature of my invention is the durable construction of the wheels, the wheels being so formed that they provide the chamber for the gear wheels and also the grooves for the rubber tire. Furthermore, by arranging the gear wheels in the manner illustrated, a mechanical advantage is secured whereby the great power is attained to rotate the wheels by the application of but comparatively little power to the pedals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination with a vehicle including a frame, a driving shaft and a driving wheel, of a gear wheel non-rotatable with respect to the frame, another gear wheel carried by the driving wheel, and means for operatively connecting said driving shaft to rotate said second-mentioned gear wheel, said gear wheels being in mesh with each other so that the second-mentioned gear wheel has planetary movement around the first-mentioned gear wheel, substantially as described.

2. The combination with a vehicle including a frame, a driving shaft and a driving wheel, of a gear wheel non-rotatable with respect to the frame, another gear wheel carried by the driving wheel and being rotatable independently thereof, and means for operatively connecting said driving shaft to impart said independent rotatable movement to the second-mentioned gear wheel, said gear wheels being in mesh with each other so that the second-mentioned gear wheel has planetary movement around the first-mentioned gear wheel, said driving wheel providing a chamber for housing said gear wheels, substantially as described.

3. The combination with a vehicle including a frame and a driving shaft, of a driving wheel having a chamber therein, a gear wheel mounted within said chamber, means for preventing rotation of said gear wheel with respect to the frame, a stud shaft within said chamber and mounted to rotate with said driving wheel, a gear wheel on said stud shaft and meshing with said first gear wheel, and means for operatively connecting said driving shaft with the second-mentioned gear wheel whereby the latter is rotated, substantially as described.

4. The combination with a vehicle including a frame and a driving shaft, of a driving wheel having a chamber therein, a gear wheel mounted within said chamber, means for preventing rotation of said gear wheel with respect to the frame, a stud shaft within said chamber and mounted to rotate with said driving wheel, a gear wheel on said stud shaft and meshing with said first gear wheel, a third gear wheel secured to said driving shaft, a gear wheel secured to said second-mentioned gear wheel and in mesh with the third-mentioned gear wheel, substantially as described.

5. The combination with a vehicle including a frame and a driving shaft, of a driving wheel having a chamber therein, a gear wheel mounted within said chamber, a bearing secured to said frame and having an angular opening, a hub on said gear wheel having an extension providing an angular surface for fitting said angular opening of the bearing, another gear wheel carried by the driving wheel and rotatable independently thereof, and means for operatively connecting said driving shaft to impart said independent rotatable movement to the second-mentioned gear wheel, said gear wheels being in mesh with each other so that the second-mentioned gear wheel has planetary movement around the first-mentioned gear wheel, substantially as described.

6. The combination with a vehicle including a frame and a driving shaft, of a driving wheel having a chamber therein, a gear wheel mounted within said chamber, a bearing on said frame and having an angular opening, a hub on said gear wheel having an extension providing an angular outer surface for fitting said angular opening of the bearing, means on said wheel forming a bearing for the hub of said gear wheel, a stud shaft mounted to rotate with the driving wheel, a second gear wheel mounted on said stud shaft and in mesh with said first gear wheel, a third gear wheel rotatable in conjunction with said second gear wheel, a fourth gear wheel having a hub secured to said driving shaft, and means on said driving wheel forming a rotatable support for said latter hub, substantially as described.

7. The combination with a vehicle including a frame and a driving shaft, of a driving wheel made in two sections, said sections being secured together and having portions oppositely bulged to provide a chamber, a gear wheel mounted within said chamber, a bearing on said frame and having an angular opening, a hub on said gear wheel having an extension providing an angular outer surface for fitting said angular opening of the bearing, means on one of the sections of the driving wheel forming a bearing for the hub of the gear wheel, said section having a hole therein through which said hub extends, a stud shaft mounted to rotate with the driving wheel and located within said chamber, a second gear wheel mounted on said stud shaft and in mesh with said first gear wheel, a third gear wheel rotatable in conjunction with said second gear wheel, a fourth gear wheel having a hub secured to said driving shaft, and means on the other section of said driving wheel forming a rotatable support for said latter hub, substantially as described.

8. The combination with a vehicle including a frame and a driving shaft, of a driving wheel made in two sections, said sections being secured together and having portions oppositely bulged to provide a chamber, a gear wheel mounted within said chamber, a bearing on said frame and having an angular opening, a hub on said gear wheel having an extension providing an angular outer surface for fitting said angular opening of the bearing, means on one of the sections of the driving wheel forming a bearing for the hub of the gear wheel, said section having a hole therein through which said hub extends, a stud shaft mounted to rotate with the driving wheel and located within said chamber, a second gear wheel mounted on said stud shaft and in mesh with said first gear wheel, a third gear wheel rotatable in conjunction with said second gear wheel, a fourth gear wheel having a hub secured to said driving shaft, means on the other section of said driving wheel forming a rotatable support for said latter hub, said latter section having a hole through which said latter hub projects, substantially as described.

In testimony whereof I have signed my name to this specification in the presence of two subscribing witnesses.

STANLEY D. SHIMER.

Witnesses:
  M. J. SHIMER.
  C. I. LATTIG.

Copies of this patent may be obtained for five cents each, by addressing the "Commissioner of Patents, Washington, D. C."